United States Patent [19]

Chollet et al.

[11] Patent Number: 4,516,425
[45] Date of Patent: May 14, 1985

[54] DEVICE FOR MEASURING THE SPEED OF THE FLUID IN THE ANNULAR SPACE OF A STEAM GENERATOR

[75] Inventors: Christian Chollet, Bois d'Arcy; Jean David, Champs sur Marne, both of France

[73] Assignee: Electricite de France Service National, Paris, France

[21] Appl. No.: 504,067

[22] Filed: Jun. 14, 1983

[30] Foreign Application Priority Data

Jun. 16, 1982 [FR] France .................. 82 10497

[51] Int. Cl.³ .......................................... G01F 15/08
[52] U.S. Cl. .................................. 73/198; 73/861.65; 73/432 R; 376/246; 376/203
[58] Field of Search ........... 73/861.65, 861.66, 861.67, 73/432 B, 198, 863.51, 863.58; 165/11 R; 376/246, 203

[56] References Cited

U.S. PATENT DOCUMENTS

| 1,295,046 | 2/1919 | Lohnes | 73/861.67 |
| 2,977,794 | 4/1961 | Taylor | 73/182 |
| 4,192,178 | 3/1980 | Wyler | 73/116 |
| 4,387,592 | 6/1983 | Welmer | 73/198 B |
| 4,442,720 | 4/1984 | Apley et al. | 73/863.51 |

FOREIGN PATENT DOCUMENTS

| 963651 | 4/1957 | Fed. Rep. of Germany . |
| 274631 | 8/1927 | United Kingdom . |
| 893381 | 4/1962 | United Kingdom . |

Primary Examiner—Herbert Goldstein

[57] ABSTRACT

A device for measuring the flow rate of a fluid in the annular space of a steam generator; having within a probe housing, kept fixed relative to the outer wall of the steam generator, a probe. A seal between the probe and the probe housing is formed by an elastic bellows fitted in such a way that it constantly applies one end of the probe against the inner wall of the generator.

6 Claims, 1 Drawing Figure

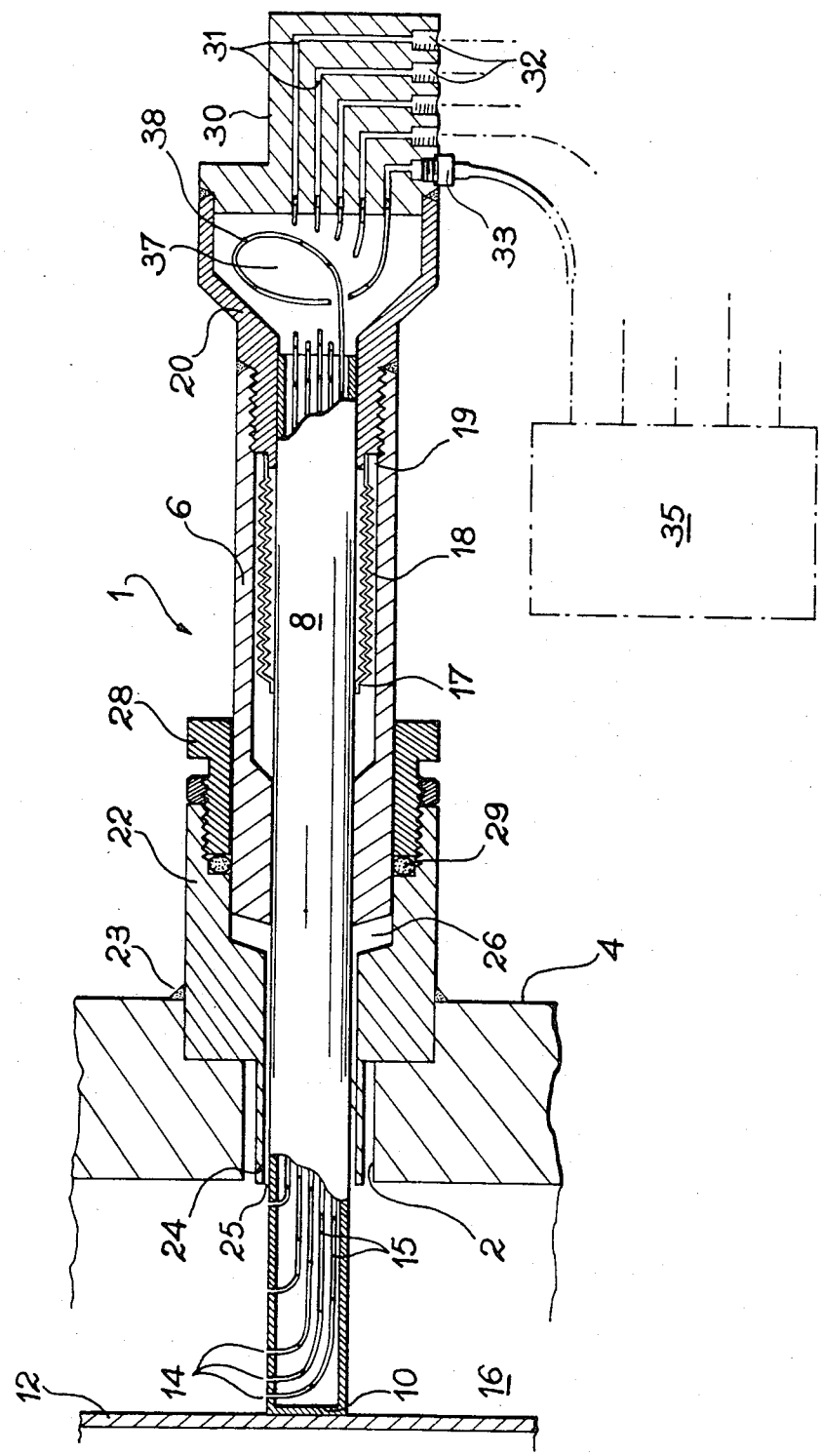

DEVICE FOR MEASURING THE SPEED OF THE FLUID IN THE ANNULAR SPACE OF A STEAM GENERATOR

BACKGROUND OF THE INVENTION

The present invention relates to a device for measuring the speed of the fluid in the annular space of a steam generator, which in particular makes it possible to measure the flow rate close to the walls defining this annular space.

Problems (e.g. corrosion, denting, i.e. constriction of the tubes due to oxidation phenomena in connection with the spacer plates) have occurred in the operation of steam generators of pressurized light water nuclear reactors and are partly due to the thermal and hydraulic conditions prevailing in the vicinity of the exchanger tubes and spacer plates. These conditions are largely dependent on the nature of the flow in the annular space of the steam generator. One of the ways to better understand the aforementioned phenomena is to have information on said flow.

When it is wished to plot the curve of the speed profile in the annular space of the steam generator, the main problem is to very accurately position the measuring points in said space and more particularly very close to the walls, in order to determine the thickness of a possible laminar layer. However, during the putting into operation of steam generators and during transient operating conditions, the instantaneous expansion effects of the inner and outer walls can differ, which makes it impossible to carry out measurements very close to these walls, because this could either destroy the probe, or may not make it possible to know the exact distance between the wall and the measuring point.

SUMMARY OF THE INVENTION

This problem is solved by a device making it possible to permanently know the fluid flow rate close to the steam generator walls, no matter what the thermal expansions or vibrations suffered by it.

According to the main feature of the device according to the invention, which has a probe body maintained fixed with respect to the outer ferrule or wall of the generator and within which is placed the actual probe, it comprises an elastic bellows surroundng the probe and whereof one end is fixed to the probe, whilst the other end is fixed to the probe body, said bellows being fitted in such a way that it constantly applies one end of the probe against the inner ferrule of the generator.

According to another feature of the present device, an instrumentation boss or connection piece is fitted to the outer wall of the steam generator level with an opening made therein, said boss having an opening for the passage of the probe.

According to another feature of the invention, the device has means making it possible to fix the probe body to the instrumentation boss, said fixing means comprising e.g. a stuffing box able to maintain the probe body within a recess made in the boss.

Finally, according to another feature of the invention, the probe comprises, in the vicinity of its end applied to the inner ferrule, several pressure connection orifices distributed between the inner ferrule and the outer ferrule and several pipes making it possible to connect each pressure connection orifice to a discharge port.

DESCRIPTION OF THE DRAWING AND PREFERRED EMBODIMENT

The invention is described in greater detail hereinafter relative to a non-limitative embodiment and the attached drawing, which is a diagrammatic sectional view of the measuring device according to the invention.

It can be seen that the device 1 according to the present invention, is fitted level with an opening made in the wall or outer ferrule 4 of the steam generator. This device essentially comprises a probe body 6, fundamentally shaped like a hollow cylindrical tube, which is fixed with respect to the outer ferrule 4 of the steam generator by means, which will be described hereinafter. Within the probe body 6 is located the actual probe, whereof one end 10 is in contact with the ferrule or inner wall 12 of the generator. In the vicinity of end 10 of probe 8, there is a series of pressure connection orifices 14, distributed between the inner ferrule 12 and the outer ferrule 4, so as to be able to establish a speed profile curve in the complete annular space 16, including in the immediate vicinity of walls 4 and 12.

The seal between the probe body 6 and the probe 8 is provided by means of an elastic bellows 18 surrounding probe 8, a first end 17 of said bellows being fixed to probe 8, whilst its other end 19 is fixed to a junction piece 20, itself sealingly screwed to the probe body 6. Apart from its first function of ensuring the seal between probe body 6 and probe 8, bellows 18, due to its elasticity, forces probe 8 in the direction of the inner wall 12 of the steam generator and makes it possible to maintain the end 10 of the probe in permanent contact with wall 12, no matter what the expansions and vibrations undergone by the latter, because the other end 19 of bellows 18 is fixed to the probe body 8, which is itself kept fixed relative to the outer ferrule 4 of the generator. Thus, the distance between wall 12 and the orifice 14 closest to said wall remains constant and it is possible to measure the fluid flow rate at a point very close to the wall, no matter what the expansions or vibrations to which the latter is exposed.

It is also possible to see that the device has an intermediate part or instrumentation boss 22, sealingly fixed to the outer wall 4 of the generator, e.g. by means of a weld bead 23. Part of the instrumentation boss 22, located in the opening 2 made in the outer ferrule 4 of the generator, is in the form of a sheath tube 24 defining a passage 25 for probe 8. The interest of this arrangement is that it permits a precise guidance with close tolerances of probe 8 in space 25, opening 2 not generally being machined with great accuracy, due to the thickness of outer ferrule 4. It is also possible to see that the portion of boss 22 outside the steam generator has a recess 26 able to receive the probe body 6. The latter is maintained in recess 26 as a result of a stuffing box 28, the necessary seal being provided by a joint 29. Thus, the probe body 6 is kept fixed relative to the outer ferrule 4, because the stuffing box 28 locks it in boss 22, which is itself welded to wall 4.

The device also has a measuring head 30, sealingly fixed to junction piece 20, which is itself tightly screwed to the probe body 6. The measuring head 30 is provided with a certain number of pipes 31 issuing into discharge ports 32, on which can be fitted a pressure connection, such as 33. Connections 33 are connected to a measuring device 35.

Probe 8 is perforated by a series of channels 15, making it possible to connect each of the pressure connection orifices 14 with one of the discharge ports 32, made in the probe head 30, as a result of flexible tubes, such as tube 38 visible in the drawing within the junction piece 20. The function of this arrangement is to facilitate the fitting of the device. Thus, it is easy to connect each of the pipes 15 to one of the pipes 31 of the probe head with the aid of capillary tubes 38, before said head is definitively welded to the junction piece 20. The capillary tubes 38 are then folded back within the inner space 37 of junction piece 20.

The device according to the invention has particularly interesting advantages, because the end of the probe is permanently applied to the inner wall 12 of the steam generator. This makes it possible to know at all times the pressure and therefore the speed in the immediate vicinity of said wall and to determine, for example, the thickness of any possible laminar layer.

Finally, although this device has been designed for investigating the flow in the annular space of a steam generator, it can obviously have other applications, particularly in all installations where it is necessary to know the characteristics of a fluid flow in the immediate vicinity of a wall.

What is claimed is:

1. A device for measuring the flow rate of a fluid in an annular space of a steam generator, said space being limited by an inner ferrule and an outer ferrule, said device comprising: a probe housing, means for keeping said housing fixed with respect to the outer ferrule, a probe placed within said housing, an elastic bellows surrounding the probe and having a first end fixed to the probe and another end fixed to said probe housing, said bellows being fitted so as to constantly apply an end of the probe to the inner ferrule.

2. A device according to claim 1 comprising an instrumentation boss fixed to the outer ferrule at an opening therein, the boss having an opening for the passage of the probe.

3. A device according to claim 2, comprising means for fixing the probe housing to the instrumentation boss.

4. A device according to claim 3 wherein said fixing means comprises a stuffing box for maintaining the probe housing within a recess in the instrumentation boss.

5. A device according to claim 1, wherein the probe comprises, in the vicinity of said end applied to the inner ferrule, a plurality of pressure connection orifices arranged between the inner ferrule and the outer ferrule.

6. A device according to claim 5, wherein said probe has a plurality of passages for connecting each of the pressure connection orifices to a discharge port.

* * * * *